(12) United States Patent
Yu et al.

(10) Patent No.: US 11,981,209 B2
(45) Date of Patent: May 14, 2024

(54) ENGINE AND ELECTRIC MOTOR ASSEMBLY, AND VEHICLE DRIVING DEVICE

(71) Applicant: Jing-Jin Electric Technologies Co., Ltd., Beijing (CN)

(72) Inventors: Ping Yu, Beijing (CN); Zhicheng Guo, Beijing (CN); Xueliang Wang, Beijing (CN)

(73) Assignee: JING-JIN ELECTRONIC TECHNOLOGIES CO., LTD., Beijing (CN)

( * ) Notice: Subject to any disclaimer, the term of this patent is extended or adjusted under 35 U.S.C. 154(b) by 613 days.

(21) Appl. No.: 17/250,428

(22) PCT Filed: May 20, 2019

(86) PCT No.: PCT/CN2019/087615
§ 371 (c)(1),
(2) Date: Jan. 20, 2021

(87) PCT Pub. No.: WO2020/042675
PCT Pub. Date: Mar. 5, 2020

(65) Prior Publication Data
US 2021/0268888 A1 Sep. 2, 2021

(30) Foreign Application Priority Data
Aug. 31, 2018 (CN) .......................... 201811010152.4

(51) Int. Cl.
| B60K 6/24 | (2007.10) |
| B60K 6/26 | (2007.10) |
| B60K 6/36 | (2007.10) |
| F02F 11/00 | (2006.01) |
| F16C 3/06 | (2006.01) |
(Continued)

(52) U.S. Cl.
CPC .................. *B60K 6/24* (2013.01); *B60K 6/26* (2013.01); *B60K 6/36* (2013.01); *F02F 11/00* (2013.01);
(Continued)

(58) Field of Classification Search
CPC .......... B60K 6/24; B60K 6/26; H02K 5/1675; H02K 7/085; H02K 7/108; H02K 9/19
(Continued)

(56) References Cited

U.S. PATENT DOCUMENTS 5,931,757 A * 8/1999 Schmidt ................. B60K 6/365
903/910
6,278,196 B1 8/2001 Ehrhart et al.
(Continued)

FOREIGN PATENT DOCUMENTS

| CA | 2512527 A1 | 2/2006 |
| CA | 2846974 A1 | 11/2014 |
(Continued)

*Primary Examiner* — Ha Dinh Ho
(74) *Attorney, Agent, or Firm* — LKGlobal | Lorenz & Kopf, LLP

(57) ABSTRACT

An engine-and-electric-machine assembly, including an engine (8) and an electric machine (9). The crankshaft (7) of the engine has an extension section (7-3) that extends to the exterior of the engine, and the rotor (3) of the electric machine is mounted to the extension section. The present disclosure improves the integration level of the engine-and-electric-machine assembly, and reduces the weight and volume of the engine-and-electric-machine assembly. A vehicle driving device including the engine-and-electric-machine assembly is also disclosed.

15 Claims, 2 Drawing Sheets

(51) Int. Cl.
*H02K 5/167* (2006.01)
*H02K 5/20* (2006.01)
*H02K 7/00* (2006.01)
*H02K 7/075* (2006.01)
*H02K 7/08* (2006.01)
*H02K 7/108* (2006.01)
*H02K 7/116* (2006.01)
*H02K 9/19* (2006.01)

(52) U.S. Cl.
CPC ............. *F16C 3/06* (2013.01); *H02K 5/1675* (2013.01); *H02K 5/203* (2021.01); *H02K 7/006* (2013.01); *H02K 7/075* (2013.01); *H02K 7/085* (2013.01); *H02K 7/108* (2013.01); *H02K 7/116* (2013.01); *H02K 9/19* (2013.01); *B60Y 2200/92* (2013.01); *B60Y 2306/05* (2013.01); *B60Y 2400/60* (2013.01); *F16C 2360/22* (2013.01)

(58) Field of Classification Search
USPC ........................................................ 74/665 B
See application file for complete search history.

(56) References Cited

U.S. PATENT DOCUMENTS

| | | | | |
|---|---|---|---|---|
| 7,992,661 | B2 * | 8/2011 | Nomura | F16F 15/123 180/65.245 |
| 8,659,192 | B2 * | 2/2014 | Isogai | H02K 7/006 310/60 R |
| 9,062,692 | B2 * | 6/2015 | Koiwai | B60K 6/387 |
| 2003/0106729 | A1 * | 6/2003 | Noreikat | B60K 6/442 903/952 |
| 2005/0045135 | A1 * | 3/2005 | Taylor | B60K 6/485 310/78 |
| 2006/0102409 | A1 * | 5/2006 | Kamada | B60L 1/003 180/249 |
| 2014/0083246 | A1 | 3/2014 | Venturi | |

FOREIGN PATENT DOCUMENTS

| | | |
|---|---|---|
| CN | 2652701 Y | 11/2004 |
| CN | 1843795 A | 10/2006 |
| CN | 101654062 A | 2/2010 |
| CN | 201472135 U | 5/2010 |
| CN | 201928133 U | 8/2011 |
| CN | 102200043 A | 9/2011 |
| CN | 102407764 A | 4/2012 |
| CN | 202278967 U | 6/2012 |
| CN | 102678314 A | 9/2012 |
| CN | 102684386 A | 9/2012 |
| CN | 202690219 U | 1/2013 |
| CN | 106194539 A | 12/2016 |
| CN | 109017262 A | 12/2018 |
| CN | 208931121 U | 6/2019 |
| DE | 19939605 A1 | 3/2001 |
| JP | 2007068387 A | 3/2007 |
| JP | 2008193841 A | 8/2008 |
| JP | 2013121823 A | 6/2013 |

\* cited by examiner

ENGINE AND ELECTRIC MOTOR ASSEMBLY, AND VEHICLE DRIVING DEVICE

CROSS-REFERENCE TO RELATED APPLICATION

This Application is a U.S. National-Stage entry under 35 U.S.C. § 371 based on International Application No. PCT/CN2019/087615, filed May 20, 2019 which was published under PCT Article 21(2) and which claims priority to Chinese Application No. 201811010152.4, filed Aug. 31, 2018, which are all hereby incorporated herein in their entirety by reference.

TECHNICAL FIELD

This Application pertains to a power assembly, and particularly relates to an engine-and-electric-machine assembly, which is used to drive a vehicle or generate electricity. The present disclosure further relates to a vehicle driving device.

BACKGROUND

Hybrid power vehicles have the advantages of energy saving, emission reduction and long endurance mileage, and are electric cars that are suitable for sustainable development. Currently, the engine-and-electric-machine assemblies of hybrid power vehicles are mostly the simple mechanical integration of the engine and the electric machine, wherein the rear end of the engine is connected to a flywheel, and the input shaft of the electric machine is connected to the flywheel via a torsional shock absorber, which has disadvantages such as a low integration level, too many component parts, a high mass, a big volume, a low reliability and a high cost. They cannot satisfy the requirements of technical progress and scale production, and are difficult to meet the targets of the driving assemblies of miniaturization and light weight. In addition, other objects, desirable features and characteristics will become apparent from the subsequent summary and detailed description, and the appended claims, taken in conjunction with the accompanying drawings and this background.

SUMMARY

Aiming at the above problems in the prior art, the present disclosure provides an engine-and-electric-machine assembly, which employs a structure in which the engine and the electric machine are integrated, which improves the integration level of the engine-and-electric-machine assembly, and effectively reduces the weight and volume of the engine-and-electric-machine assembly.

The present disclosure further relates to a vehicle driving device, provided with the above engine-and-electric-machine assembly.

To achieve the above object, the technical solutions of the present disclosure are realized as follows:

The present disclosure provides an engine-and-electric-machine assembly, comprising an engine and an electric machine, and a crankshaft being provided in the engine, wherein the crankshaft is provided with an extension section that extends to an exterior of the engine, the extension section forms a rotation shaft of the electric machine, and a rotor of the electric machine is mounted on the extension section.

Optionally, the engine is provided adjacent to the electric machine, the electric machine is provided with a housing, and a left end of the housing is directly mounted to a cylinder block of the engine, to form a fixing and sealing face; and the electric machine is further provided with a right end cap, and the housing of the electric machine and the right end cap are integrally manufactured.

Optionally, a flange is provided at one end of the housing of the electric machine that is connected to the cylinder block of the engine, and is connected to the cylinder block of the engine via bolts, and a sealing structure is provided at the connection thereof.

Optionally, a double-oil-seal structure is provided between the engine and the electric machine, to bidirectionally seal the engine and the electric machine.

Optionally, a bearing seat is provided on the right end cap of the electric machine, for mounting an auxiliary bearing for supporting the rotation shaft of the electric machine.

Optionally, the electric machine is a permanent magnet machine, an induction machine, a hybrid excited machine or a switched reluctance machine.

Optionally, a cooling mode of the electric machine is oil cooling, water cooling or air cooling, and the rotor and the rotation shaft of the electric machine are connected fixedly by a spline, or are connected fixedly by interference fitting.

Optionally, an oil channel or water channel is provided inside the housing of the electric machine.

The present disclosure further provides a vehicle driving device, wherein the vehicle driving device comprises the above-described engine-and-electric-machine assembly, the vehicle driving device further comprises a gearbox, the rotation shaft of the electric machine is connected to the gearbox, and the gearbox is connected to a axle shaft of a vehicle.

Optionally, the vehicle driving device further comprises a main driving motor, and a rotation shaft of the main driving motor is also connected to the gearbox.

The engine-and-electric-machine assembly, by employing the above structure configuration, has the following advantages:

In the present disclosure the engine and the electric machine are integrated, which has advantages such as a small quantity of component parts, a small volume, a small weight, a short axial length, and easy arrangement in the engine compartment.

The vehicle driving device, by employing the above structure configuration, has the following advantages:

The vehicle driving device according to the present disclosure comprises the main driving motor, which may be used by a hybrid power vehicle.

BRIEF DESCRIPTION OF THE DRAWINGS

The present invention will hereinafter be described in conjunction with the following drawing figures, wherein like numerals denote like elements, and.

Figure 1:
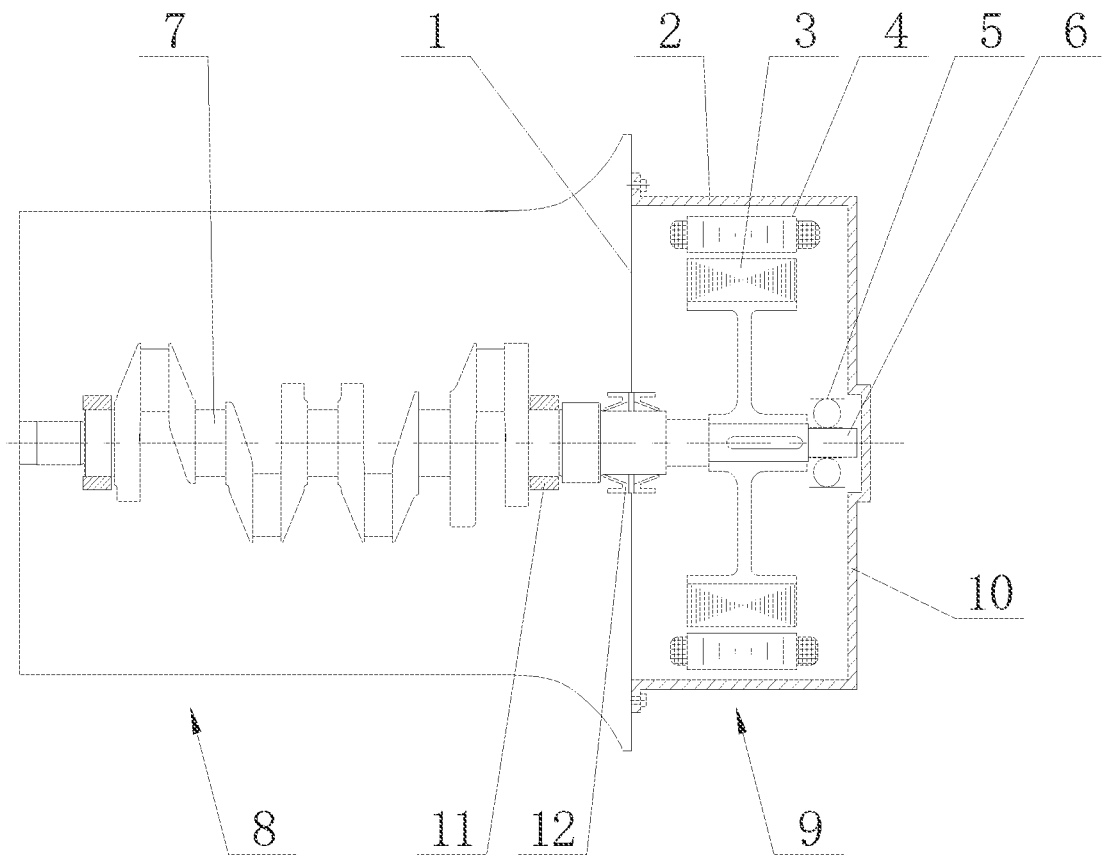
FIG. 1 is a schematic diagram of the connecting structure of the engine and the electric machine according to a first embodiment of the present disclosure.

In the drawings: 1. cylinder block; 2. housing; 3. rotor; 4. stator; 5. auxiliary bearing; 6. rotation shaft; 7. crankshaft;

7-1. main body; 7-2. transition section; 7-3. extension section; 8. engine; 9. electric machine; 10. right end cap; 11. sliding bearing; 12. double oil seal; 13. clutch; 14. main driving motor; 15. rotation shaft; and 16. gearbox.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

In order to make the objects, the technical solutions and the advantages of the present disclosure clearer, the embodiments of the present disclosure will be described below in further detail in conjunction with the drawings.

The first embodiment

Figure 2:
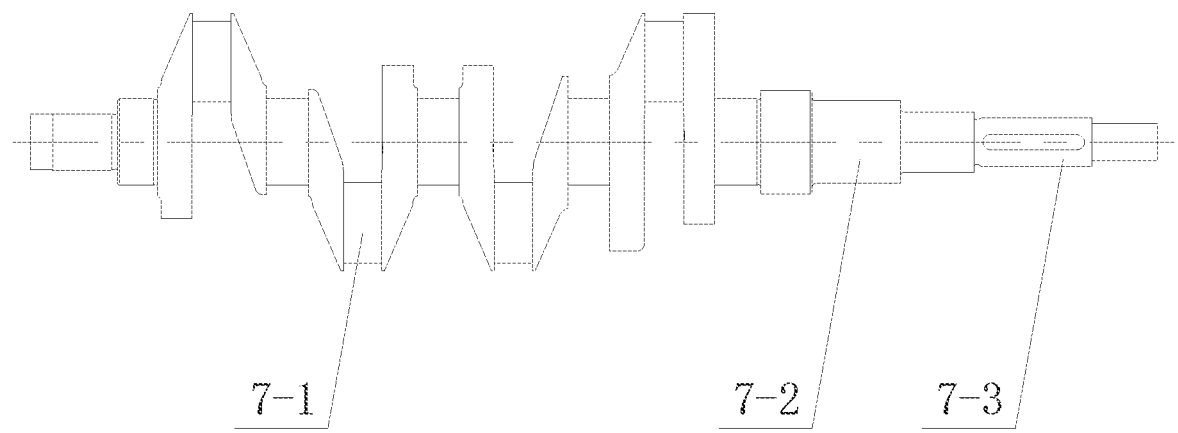
FIG. 2 is a schematic structural diagram of the crankshaft according to the first embodiment of the present disclosure.

As shown in FIGS. 1 and 2, in the first embodiment of the present disclosure, an engine-and-electric-machine assembly comprises an engine 8 and an electric machine 9. The engine 8 is in fuel mode. The electric machine 9 may be an electric generator or an ISG electric machine, and may also be an electric motor.

A crankshaft 7 is provided in the engine 8. The crankshaft 7 is provided with an extension section 7-3 that extends to the exterior of the engine 8. The extension section 7-3 constitutes a rotation shaft 6 of the electric machine 9. A rotor 3 of the electric machine 9 is mounted on the extension section 7-3.

In another word, in the present embodiment, the rotor 3 of the electric machine 9 is directly mounted to the crankshaft 7 of the engine 8, that is, the rotation shaft 6 of the electric machine 9 and the crankshaft 7 of the engine 8 are integrally manufactured.

In the present embodiment, the engine 8 and the electric machine 9 are integrated, and do not have the components for the connection between an electric machine and an engine in conventional solutions, such as a flywheel and a torsional shock absorber, resulting in less component parts, a smaller volume, a lighter weight and a more compact structure.

In order to further reduce the parts and reduce the weight, in the present embodiment, the engine 8 and the electric machine 9 are provided adjacent to each other, the electric machine 9 is provided with a housing 2, and the left end of the housing 2 is directly mounted to a cylinder block 1 of the engine, and, particularly, mounted to a front flange face of the cylinder block 1, to form a fixing and sealing face.

The electric machine 9 is further provided with a right end cap 10, and the housing 2 of the electric machine 9 is manufactured integrally with the right end cap 10. Such a design can simplify the housing structure of the electric machine 9, and further improve the integration level.

In the electric machine 9 a left end cap is eliminated, which can reduce the axial length of the engine-and-electric-machine assembly.

As shown in FIG. 1, a flange is provided at one end of the housing 2 of the electric machine 9 that is connected to the cylinder block 1 of the engine 8, and is connected to the cylinder block 1 of the engine 8 via bolts, and the cylinder block 1 of the engine 8 is provided with threaded holes. A sealing structure is provided at the connection, for example a sealing ring, to seal the interior of the housing of the electric machine 9.

A double oil seal 12 is provided between the engine 8 and the electric machine 9, to seal bidirectionally the engine 8 and the electric machine 9. The double oil seal 12 may be provided on the cylinder block 1 of the engine 8, and correspondingly the cylinder block 1 of the engine 8 is provided with a sealing groove to mount a sealing element.

As shown in FIG. 2, a transition section 7-2 is provided between a main body 7-1 of the crankshaft 7 and the extension section 7-3, and the double oil seal 12 seals a spacing between the transition section 7-2 and the sealing groove on the cylinder block 1, thereby sealing bidirectionally the engine 8 and the electric machine 9.

As shown in FIG. 1, a bearing seat is provided at the right end cap 10 of the electric machine 9, and is used to mount an auxiliary bearing 5 to support the rotation shaft 6 of the electric machine 9. The auxiliary bearing 5 and the rotation shaft 6 are connected by transition fitting or interference fitting, to reduce the radial runout of the rotor 3, to guarantee that the air gap of the electric machine does not vary greatly.

The crankshaft 7 is provided with a sliding bearing 11 between the engine 8 and the electric machine 9. The sliding bearing 11 may be considered as a bearing used commonly by the crankshaft 7 and the rotation shaft 6.

In the present embodiment, the electric machine 9 may be a permanent magnet machine, an induction machine, a hybrid excited machine or a switched reluctance machine, and the stator 4 of the electric machine 9 may employ a distributed winding or a concentrated winding.

The cooling mode of the electric machine 9 is any one of oil cooling, water cooling or air cooling, and the rotor and the rotation shaft 6 of the electric machine 9 are connected fixedly by a key, such as a spline or a flat key, or are connected fixedly by interference fitting. As shown in FIG. 2, the crankshaft 7 is provided with a key groove on the extension section 7-3. If a spline connection is employed, the extension section 7-3 may be provided with an external spline, and the rotor of the electric machine 9 may be provided with an internal spline.

An oil channel or a water channel is provided inside the housing 2 of the electric machine 9, wherein if the cooling mode is oil cooling, an oil channel is provided, and if the cooling mode is water cooling, a water channel is provided.

Radiating ribs may be provided on the outside of the housing 2 of the electric machine 9, to improve the effect of heat dissipation.

The second embodiment

Figure 3:
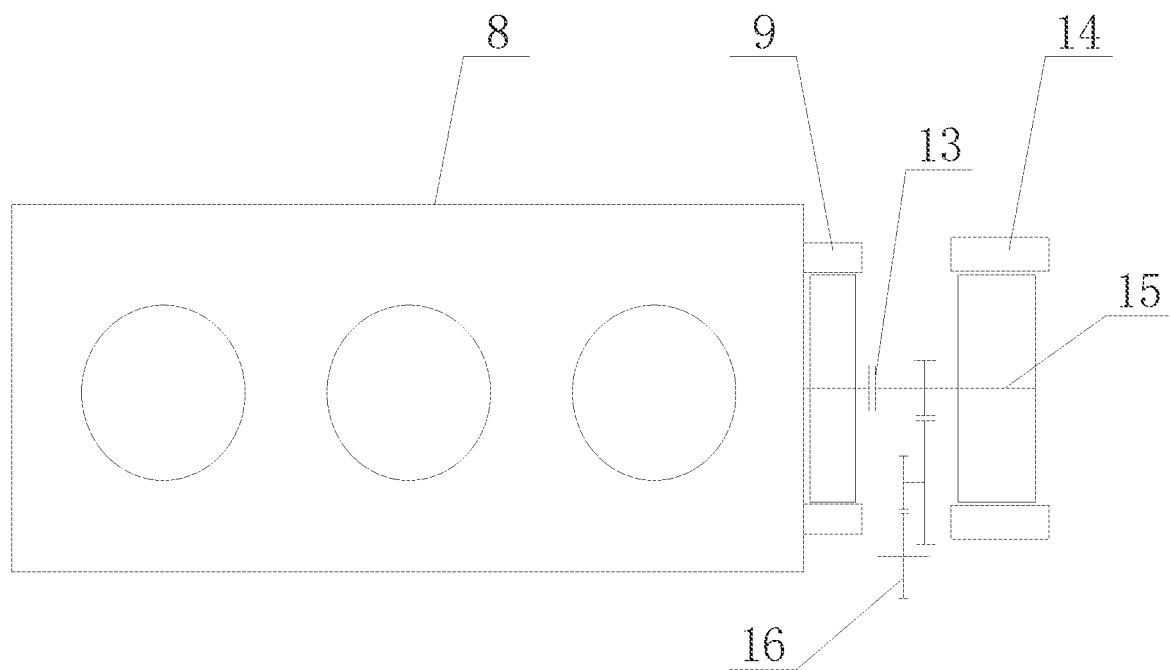
FIG. 3 is a schematic structural diagram of the vehicle driving device according to a second embodiment of the present disclosure.

FIG. 3 shows the second embodiment of the present disclosure. The present embodiment provides a vehicle driving device, which comprises the engine-and-electric-machine assembly according to the first embodiment, and further comprises a main driving motor 14, wherein the main driving motor 14 is an electric motor.

The vehicle driving device further comprises a gearbox 16, both of the rotation shaft of the electric machine 9 and the rotation shaft of the main driving motor 14 are connected to the gearbox 16, and the gearbox 16 is further connected to the axle shaft of a vehicle. The engine-and-electric-machine assembly and the main driving motor 14 may individually drive the vehicle by using the gearbox 16.

The rotation shaft 15 of the main driving motor 14 and the rotation shaft 6 of the electric machine 9 may be coaxial, in which a clutch 13 is provided between the rotation shaft 15 and the rotation shaft 6.

The clutch 13 is preferably an electromagnetic clutch.

The vehicle driving device is provided with the main driving motor 14, and may be used by a hybrid power vehicle. Optionally, the vehicle can be driven only by the main driving motor 14, only by the engine 8, by both the engine 8 and the main driving motor 14, or jointly by the engine 8, the electric machine 9 and the main driving motor 14.

When the main driving motor 14 is driving the vehicle to travel, the clutch 13 may be disengaged. When the engine 8 is driving the vehicle to travel, the clutch 13 is required to be engaged.

The other structures of the engine-and-electric-machine assembly of the second embodiment of the present disclosure are the same as those of the first embodiment, and are not described repeatedly here.

The above are merely particular embodiments of the present disclosure. By the teaching of the present disclosure, a person skilled in the art can make other modifications or variations on the basis of the above embodiments. A person skilled in the art should understand that the above particular descriptions are only for the purpose of better interpreting the present disclosure, and the protection scope of the present disclosure should be subject to the protection scope of the claims.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. An engine-and-electric-machine assembly, comprising an engine and an electric machine, and a crankshaft being provided in the engine, wherein the crankshaft is provided with an extension section that extends to an exterior of the engine, the extension section constitutes a rotation shaft of the electric machine, and a rotor of the electric machine is mounted on the extension section,
   wherein the engine is provided adjacent to the electric machine, the electric machine is provided with a housing, and a left end of the housing is directly mounted to a cylinder block of the engine, to form a fixing and sealing face; and the electric machine is further provided with a right end cap, and the housing of the electric machine and the right end cap are integrally manufactured,
   a double-oil-seal structure is provided between the engine and the electric machine, to bidirectionally seal the engine and the electric machine,
   a sealing groove is provided on the cylinder block of the engine for mounting the double-oil-seal structure,
   a transition section is provided between a main body of the crankshaft and the extension section, and the double-oil-seal structure seals a spacing between the transition section and the sealing groove on the cylinder block.

2. The engine-and-electric-machine assembly according to claim 1, wherein a flange is provided at one end of the housing of the electric machine that is connected to the cylinder block of the engine, and is connected to the cylinder block of the engine via bolts, and a sealing structure is provided at the connection thereof.

3. The engine-and-electric-machine assembly according to claim 1, wherein a bearing seat is provided on the right end cap of the electric machine, for mounting an auxiliary bearing for supporting the rotation shaft of the electric machine.

4. The engine-and-electric-machine assembly according to claim 1, wherein the electric machine is a permanent magnet machine, an induction machine, a hybrid excited machine or a switched reluctance machine.

5. The engine-and-electric-machine assembly according to claim 1, wherein a cooling mode of the electric machine is oil cooling, water cooling or air cooling, and the rotor and the rotation shaft of the electric machine are connected fixedly by a spline, or are connected fixedly by interference fitting.

6. The engine-and-electric-machine assembly according to claim 1, wherein an oil channel or water channel is provided inside the housing of the electric machine.

7. A vehicle driving device, wherein the vehicle driving device comprises the engine-and-electric-machine assembly according to claim 1, the vehicle driving device further comprises a gearbox, the rotation shaft of the electric machine is connected to the gearbox, and the gearbox is connected to a axle shaft of a vehicle.

8. The vehicle driving device according to claim 7, wherein the vehicle driving device further comprises a main driving motor, and a rotation shaft of the main driving motor is also connected to the gearbox.

9. The vehicle driving device according to claim 8, wherein the rotation shaft of the main driving motor and the rotation shaft of the electric machine are coaxial, and a clutch is provided between the rotation shaft of the main driving motor and the rotation shaft of the electric machine.

10. A vehicle driving device, wherein the vehicle driving device comprises the engine-and-electric-machine assembly according to claim 1, the vehicle driving device further comprises a gearbox, the rotation shaft of the electric machine is connected to the gearbox, and the gearbox is connected to a axle shaft of a vehicle.

11. A vehicle driving device, wherein the vehicle driving device comprises the engine-and-electric-machine assembly according to claim 2, the vehicle driving device further comprises a gearbox, the rotation shaft of the electric machine is connected to the gearbox, and the gearbox is connected to a axle shaft of a vehicle.

12. A vehicle driving device, wherein the vehicle driving device comprises the engine-and-electric-machine assembly according to claim 3, the vehicle driving device further comprises a gearbox, the rotation shaft of the electric machine is connected to the gearbox, and the gearbox is connected to a axle shaft of a vehicle.

13. A vehicle driving device, wherein the vehicle driving device comprises the engine-and-electric-machine assembly according to claim 4, the vehicle driving device further comprises a gearbox, the rotation shaft of the electric machine is connected to the gearbox, and the gearbox is connected to a axle shaft of a vehicle.

14. A vehicle driving device, wherein the vehicle driving device comprises the engine-and-electric-machine assembly according to claim 5, the vehicle driving device further comprises a gearbox, the rotation shaft of the electric machine is connected to the gearbox, and the gearbox is connected to a axle shaft of a vehicle.

15. A vehicle driving device, wherein the vehicle driving device comprises the engine-and-electric-machine assembly according to claim 6, the vehicle driving device further comprises a gearbox, the rotation shaft of the electric machine is connected to the gearbox, and the gearbox is connected to a axle shaft of a vehicle.

\* \* \* \* \*